United States Patent [19]

Uratani

[11] Patent Number: 5,788,872
[45] Date of Patent: Aug. 4, 1998

[54] REMOVABLE MARKING DEVICE FOR MOLD

[76] Inventor: Hideki Uratani. 6-17-201. Shinmachi 3-chome. Nishi-ku. Osaka City. Osaka. Japan

[21] Appl. No.: 767,626

[22] Filed: Dec. 17, 1996

[51] Int. Cl.[6] .................................................. B29C 33/00
[52] U.S. Cl. ........................ 249/103; 249/104; 249/140; 425/190; 425/192 R; 425/195
[58] Field of Search ............................. 249/53 R. 53 M. 249/103, 104, 140; 425/183, 190, 192 R. 193, 195; 264/132, 509

[56] References Cited

U.S. PATENT DOCUMENTS

| | | | |
|---|---|---|---|
| 4,137,962 | 2/1979 | Pol | 249/103 |
| 4,384,702 | 5/1983 | Boskovic | 425/195 |
| 4,708,314 | 11/1987 | Kuhling | 249/140 |
| 5,620,716 | 4/1997 | Opitz | 249/103 |

FOREIGN PATENT DOCUMENTS

| | | | |
|---|---|---|---|
| 89/02831 | 4/1989 | WIPO | 249/103 |

*Primary Examiner*—Patrick Ryan
*Assistant Examiner*—Joseph Leyson
*Attorney, Agent, or Firm*—Curtis L. Harrington

[57] ABSTRACT

The present invention provides a removable marking device for a mold which includes a substantially cylindrical outer member fitted into the mold, an axially rotatable indicator fitted into the outer member and indications formed on top surfaces of the outer member and the indicator which is formed by an indication portion facing an inner surface of the mold and a screw portion extended from the indication portion, the outer member having a three-stepped bore which has an upper bore portion, a middle bore portion extending from the upper bore portion of a cross-sectional dimension larger than that of the upper bore portion and a lower bore portion extending from the middle bore portion of a cross-sectional dimension larger than that of the middle bore portion, the indicator inserted into the bore with the indication portion arranged in the upper bore portion and the screw portion arranged into the middle bore portion, a cover member inserted to the lower bore portion and clinging to the outer member, a nut threaded to a lower end of the screw portion of the indicator, a spring interposed above the nut within the middle bore portion, and the indicator biased downwardly by the spring in combination with the nut. Making use of the present removable marking device for a mold, molded products each having an even surface with no irregularity can be formed, and indications can be readily changed.

4 Claims, 6 Drawing Sheets

REMOVABLE MARKING DEVICE FOR MOLD

FIELD OF THE INVENTION

This invention relates to a marking device for a mold to mark on each molded product formed in a mold, and in particular to a removable marking device for a mold with readily changeable indications by which molded products each having an even surface with no irregularity can be formed.

BACKGROUND

Surfaces of molded products generally have various indications such as a date of production, a lot number, product number and so on by which producers can clear up causes of inferior molded products or check their stock.

A marking device is removably inserted into a mold with its indication portion facing the inner surface of the mold and held there during molding so that the above stated indications carried on the indication portion can be marked on each molded product.

One conventional marking device is shown as an example in FIG. 8.

The marking device (A) comprises an outer indicator (B) fitted into a mold, an inner indicator (C) fitted into the outer indication portion (B) which comprises a first cylinder portion (c1) and a second cylinder portion (c2) with a smaller cross-sectional dimension than that of the first cylinder portion (c1), and O ring (D) mounted to the inner indicator (C), each top surface of the outer and inner indicators (B) (C) facing the inner surface of the mold having indications such as letters and numbers and so on.

For example, if the outer indicator (B) indicates months as shown in FIG. 8 and the inner indicator (C) indicates a year, it is enough to change only the inner indicator (C) when a new year begins, however, the marking device (A), which is fitted into the mold with the top surfaces of the outer and inner indicators (B) (C) facing the inner surface of the mold, should be removed, as a whole, to change the inner indicator (C). It is very troublesome and inefficient to remove the marking device (A) as a whole.

In view of the aforesaid problem, a marking device as shown in FIG. 9 has been produced. An inner indicator of the marking device can be be separately removed without removing the marking device from a mold as a whole.

The marking device (A) shown in FIG. 9 comprises an outer member (E) fitted into a mold and an indicator (F) fitted into the outer member (E) and including an indication portion (f1) facing the inner surface of the mold and a screw portion (f2).

The outer member (E) includes an inner bore comprising a lower bore portion (e1) of a first cross-sectional dimension and an upper bore portion (e2) of a second cross-sectional dimension. The lower bore portion (e1) has a thread groove portion to which the screw portion (f2) of the indicator (F) is threaded. A spring (G) is interposed under the indication portion (f1) within the upper bore portion (e2) so that only the indicator (F) can be removed from the mold by unscrewing the indicator (F) out of the outer member (E) by a screwdriver and so on.

In the marking device shown in FIG. 9, since the indicator (F) is constantly biased toward the inner surface of the mold by means of the spring (G), the indicator (F) tends to project from the top surface of the outer member (E). The marking device also has the problem that molded products each

2 having an even surface cannot be formed due to irregularities caused by the indicator (F) which is not flush with the outer member (E).

SUMMARY OF THE INVENTION

In view of the problem of conventional marking devices as stated above, the present invention provides a removable marking device for a mold with readily changeable indications by which molded products each having an even surface with no irregularity can be formed.

The present invention provides a removable marking device for a mold which includes a substantially cylindrical outer member fitted into a mold, an axially rotatable indicator fitted into the outer member and indications formed on the top surfaces of the outer member and the indicator; the indicator comprising an indication portion facing the inner surface of the mold and a screw portion extended from the indication portion, the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion, the indicator inserted into the bore with the indication portion arranged in the upper bore portion and the screw portion arranged in the middle bore portion, a cover member inserted into the lower bore portion and clinging to the outer member, a nut threaded to the lower end of the indicator, a spring interposed above the nut within the middle bore portion, and the indicator biased downwardly by the spring in combination with the nut.

In the aforesaid removable marking device, the outer member is completely flush with the indicator so that molded products each having an even surface with no irregularity can be formed, since the indicator is constantly biased not to project from the top surface of the outer member. When a new year begins, only the indicator can be changed by unscrewing the indicator out of the nut by a screwdriver without decomposing of a mold so that indications can be readily changed and users operate the removable marking device efficiently.

The present invention provides another removable marking device for a mold which includes a substantially cylindrical outer member fitted into a mold, an axially rotatable indicator fitted into the outer member and indications formed on the top surfaces of the outer member and the indicator; the indicator comprising an indication portion facing the inner surface of the mold and a screw portion extended from the indication portion, the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion, the indicator inserted into the bore with the indication portion arranged in the upper bore portion and the screw portion arranged in the middle bore portion, a cover member inserted to the lower bore portion and clinging to the outer member, a nut threaded to the lower end of the indicator, a spring interposed above the nut and within the middle bore portion, the indicator biased downwardly by the spring in combination with the nut, recesses formed circumferentially at even intervals on the bottom surface of the indication portion, and a pin passing through the outer member to be engaged to one of the recesses for positioning and fixing the indicator. In the aforesaid removable marking device, the indicator can be rotated to be positioned and fixed exactly so that users can operate the removable marking device efficiently.

The present invention provides still another removable marking device for a mold which includes a substantially cylindrical outer member fitted into a mold, an axially rotatable indicator fitted into the outer member and indications formed on the top surfaces of the outer member and the indicator; the indicator comprising an indication portion facing the inner surface of the mold and a screw portion extended from the indication portion, the indication portion having a projection and a groove on the bottom surface thereof, a first spacer and a second spacer engaged to the screw portion, the first spacer abutting on the bottom surface of the indication portion, the second spacer having recesses formed circumferentially at even intervals on the upper surface thereof, the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion, the indicator inserted into the bore with the indication portion and the first spacer arranged in the upper bore portion and the screw portion and the second spacer arranged in the middle bore portion, the outer member having a thread groove portion on its inner surface at the lower bore portion to which a cover member is threaded, a nut threaded to the lower end of the indicator, a spring interposed between the nut and the second spacer, and the indicator biased downwardly by the spring in combination with the nut.

The present invention further provides a removable marking device for a mold which includes a substantially cylindrical outer member fitted into a mold, an axially rotatable indicator fitted into the outer member and indications formed on the top surfaces of the outer member and the indicator; the indicator comprising an indication portion facing the inner surface of the mold and a screw portion extended from the indication portion, the indication portion having a projection and a groove on the bottom surface thereof, a first spacer and a second spacer engaged to the screw portion, the first spacer abutting on the bottom surface of the indication portion, the second spacer having recesses formed circumferentially at even intervals on the upper surface thereof, the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion, the indicator inserted into the bore with the indication portion and the first spacer arranged in the upper bore portion and the screw portion and the second spacer arranged in the middle bore portion, the outer member having a thread groove portion on its inner surface at the lower bore portion to which a cover member is threaded, a nut threaded to the lower end of the indicator, a spring interposed between the nut and the second spacer, the indicator biased downwardly by the spring in combination with the nut, the outer member having an engageable groove formed axially on its inner surface at the middle bore portion, and each of the second spacer and the nut provided with an engageable projection formed on each of the outer edges thereof to engage with the engageable groove.

In the aforesaid removable marking device, the indicator can be rotated to be positioned and fixed exactly so that users can operate the removable marking device efficiently.

DETAILED DESCRIPTION OF THE INVENTION

Figure 1:
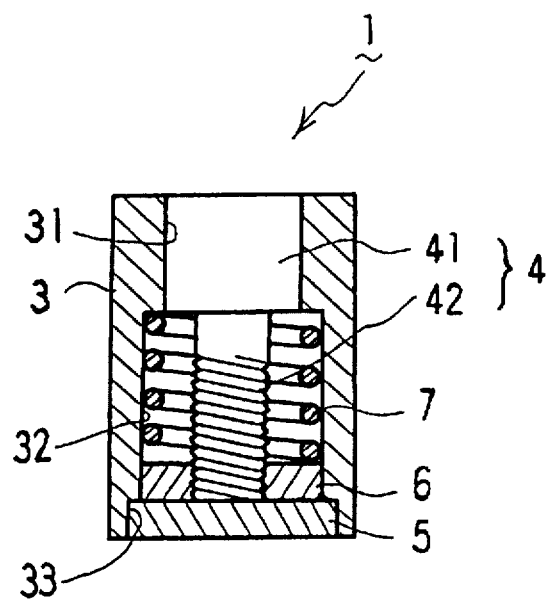
FIG. 1 is a sectional view showing a first embodiment of a removable marking device for a mold relating to the present invention.

Referring to the drawings, favorable embodiments of a removable marking device for a mold relating to the present invention will be described hereinafter.

Figure 2:
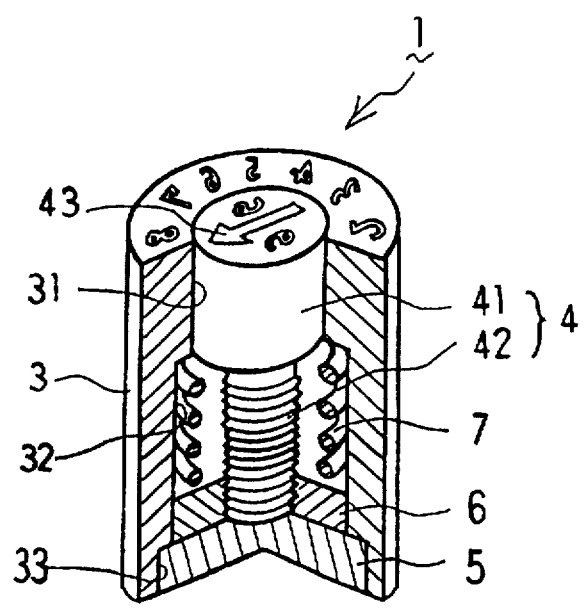
FIG. 2 is a perspective broken view of FIG. 1.

FIG. 1 is a sectional view showing a first embodiment of a removable marking device for a mold relating to the present invention, and FIG. 2 is a perspective broken view of FIG. 1.

The removable marking device (1) relating to the first embodiment includes a substantially cylindrical outer member (3) and an axially rotatable indicator (4) fitted into the outer member (3).

Figure 3:
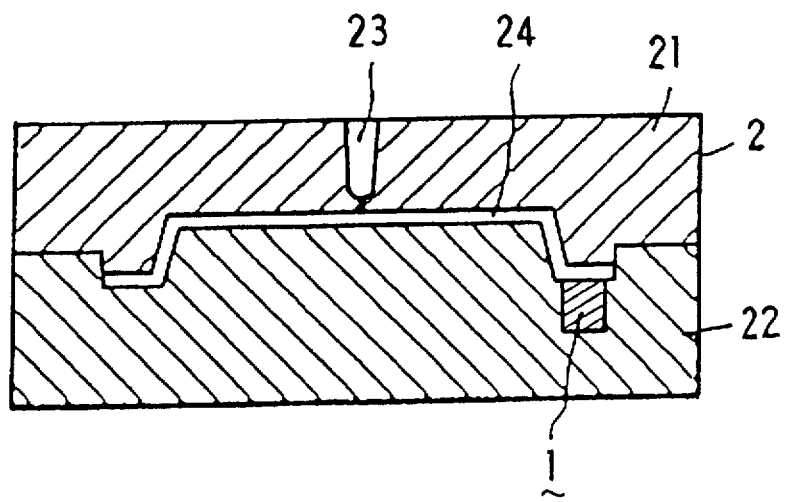
FIG. 3 is a sectional view showing a removable marking device for a mold relating to the present invention mounted to a mold.

FIG. 3 is a sectional view showing a removable marking device for a mold (1) relating to the present invention mounted to a mold (2).

The mold (2) comprises a fixed body (21) having an inlet (23) and a movable plunger (22) which is brought close to and away from the fixed body (21). A cavity (24) is formed between the fixed body (21) and the movable plunger (22). Facing the cavity (24), the removable marking device (1) is mounted to the movable plunger (22).

On the top surface of the outer member (3) (which faces the inner surface of the mold), indications are formed in such a manner that FIGS. 1, 2, 3, . . . 12 to indicate months are impressed circumferentially at even intervals, while on the top surface of the indicator (4), indications are formed in such a manner that a figure to indicate a year (96 is shown as an example) and an arrow (43) to identify one of the months indicated on the top surface of the outer member (3) are impressed, thus the year indicated on the indicator (4) and the month identified by the arrow (43) can be marked at once.

The arrow (43) is a slot which can accomodate a screwdriver blade to screw the indicator (4).

The indicator (4) comprises an indication portion (41) and a screw portion (42) extended from the indication portion (41). The screw portion (42) is reversely threaded.

The outer member has a three-stepped bore which comprises an upper bore portion (31), a middle bore portion (32) extended from the upper bore portion (31) of a cross-sectional dimension larger than that of the upper bore portion (31) and a lower bore portion (33) extended from the middle bore portion (32) of a cross-sectional dimension larger than that of the middle bore portion (32). The indicator is inserted into the bore in such a manner that the indication portion (41) and the screw portion (42) are respectively arranged within upper bore portion (31) and the middle bore portion (32). A cover member (5) is inserted into the lower bore portion (33) and clings to the outer member (3).

A nut (6) is threaded to the lower end of the indicator (4) and a spring (7) is interposed above the nut (6) within the middle bore portion (32). The indicator (4) is biased downwardly by the spring (7) in combination with the nut (6) so that the indicator (4) cannot project from the top surface of the outer member (3).

In the aforesaid removable marking device (1), the outer member (3) is completely flush with the indicator (4) so that molded products each having an even surface with no irregularity can be formed, since the indicator (4) is constantly biased not to project from the top surface of the outer member (3).

When a new year begins, only the indicator (4) can be changed by unscrewing the indicator (4) out of the nut (6) by a screwdriver without decomposing of a mold so that indications can be readily changed and users can operate the removable marking device efficiently.

Figure 4:
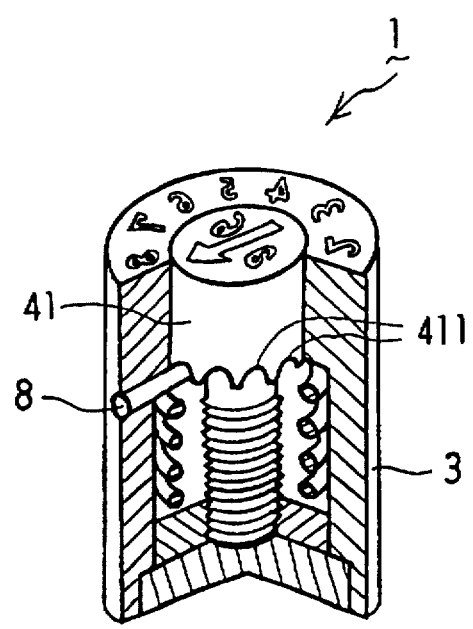
FIG. 4 is a perspective broken view showing an alternative first embodiment.

FIG. 4 is a perspective broken view showing an alternative first embodiment.

In the removable marking device (1) shown in FIG. 4, an indication portion (41) has recesses (411) formed circumferentially at even intervals on the bottom surface thereof, and a pin (8) is engaged to one of the recesses (411) through an indicator to position and fix the outer member (3).

In the removable marking device (1) relating to the alternative embodiment, the indicator (4) can be positioned and fixed exactly so that users can operate the removable marking device efficiently.

Figure 5:
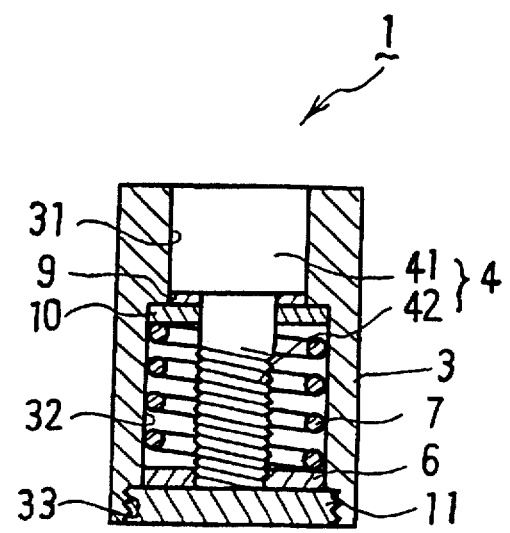
FIG. 5 is a sectional view showing a second embodiment of a removable marking device for a mold relating to the present invention.
Figure 6:
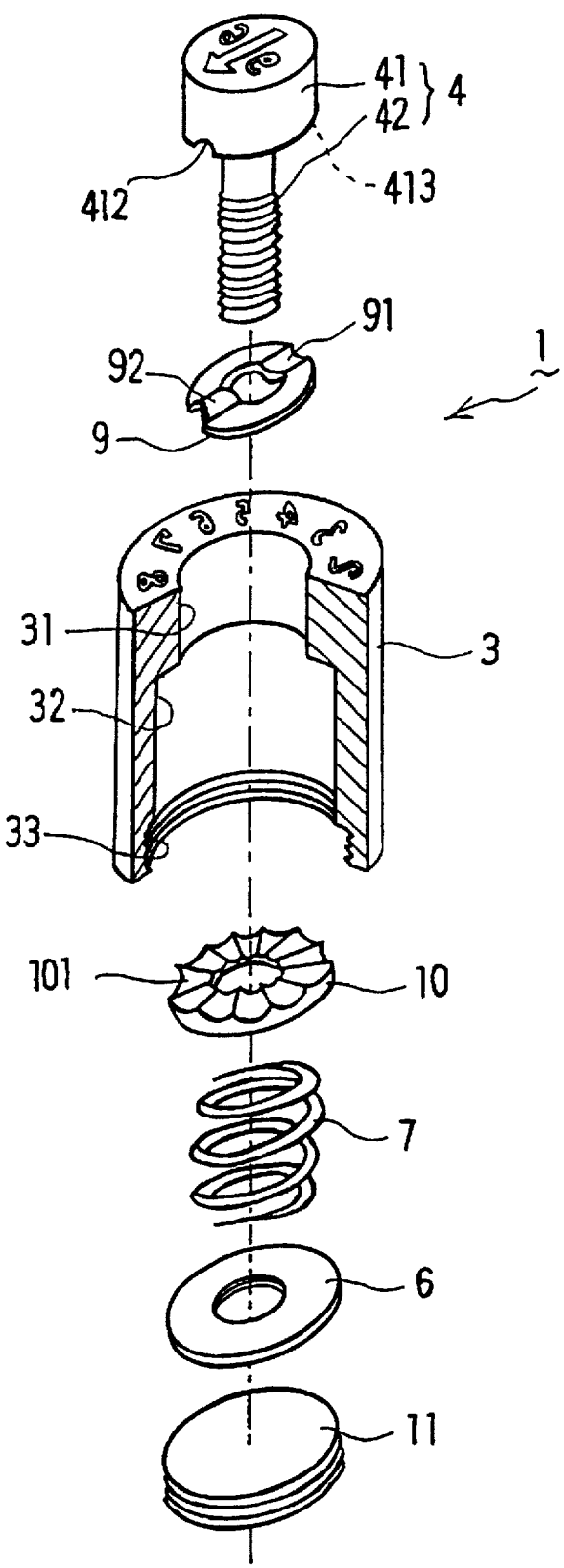
FIG. 6 is a perspective exploded view of FIG. 5.

FIG. 5 is a sectional view showing a second embodiment of a removable marking device for a mold (1) relating to the present invention, and FIG. 6 is a perspective exploded view of FIG. 5.

The removable marking device (1) relating to the second embodiment includes a substantially cylindrical outer member (3) fitted into a mold (2), an axially rotatable indicator (4) fitted into the outer member (3).

The indicator (4) comprises an indication portion (41) facing the inner surface of the mold and a screw portion (42) extended from the indication portion (41), and the indication portion (41) has a groove (412) and a projection (413) on the bottom surface thereof. The screw portion (42) is reversely threaded.

A first spacer (9) and a second spacer (10) are engaged to the screw portion. The first spacer (9) is provided with a projection (92) and a groove (91) respectively corresponding to the groove (412) and the projection (413) formed on the bottom surface of the indication portion (41) and arranged to abut on the bottom surface of the indication portion (41). On the top surface of the second spacer (10), recesses (101) are formed circumferentially at even intervals. The groove (91) of the first spacer (9) engages one of the recesses (101) of the second spacer (10).

The outer member has a three-stepped bore which comprises an upper bore portion (31), a middle bore portion (32) extended from the upper bore portion (31) of a cross-sectional dimension larger than that of the upper bore portion (31) and a lower bore portion (33) extended from the middle bore portion (32) of a cross-sectional dimension larger than that of the middle bore portion (32). The indicator (4) is inserted into the bore in such a manner that the indication portion (41) and the first spacer (9) are arranged in the upper bore portion (31) and the screw portion (42) and the second spacer (10) are arranged in the middle bore portion (32). The outer member (3) has a thread groove portion on its inner surface at the lower bore portion (33) to which a cover member (11) is threaded. A nut (6) is threaded to the lower end of the indicator (4), and a spring (7) is interposed between the nut (6) and the second spacer (10). The indicator (4) is biased downwardly by the spring in combination with the nut (6) not to project from the top surface of the outer member (3).

In the removable marking device (1) relating to the second embodiment, the outer member (3) is completely flush with the indicator (4) so that molded products each having an even surface with no irregularity can be produced, since the indicator (4) is constantly biased not to project from the top surface of the outer member (3).

When a new year begins, only the indicator (4) can be changed by unscrewing the indicator (4) out of the nut (6) by a screwdriver without decomposing of a mold so that indications can be readily changed and users can operate the removable marking device efficiently.

Figure 7:
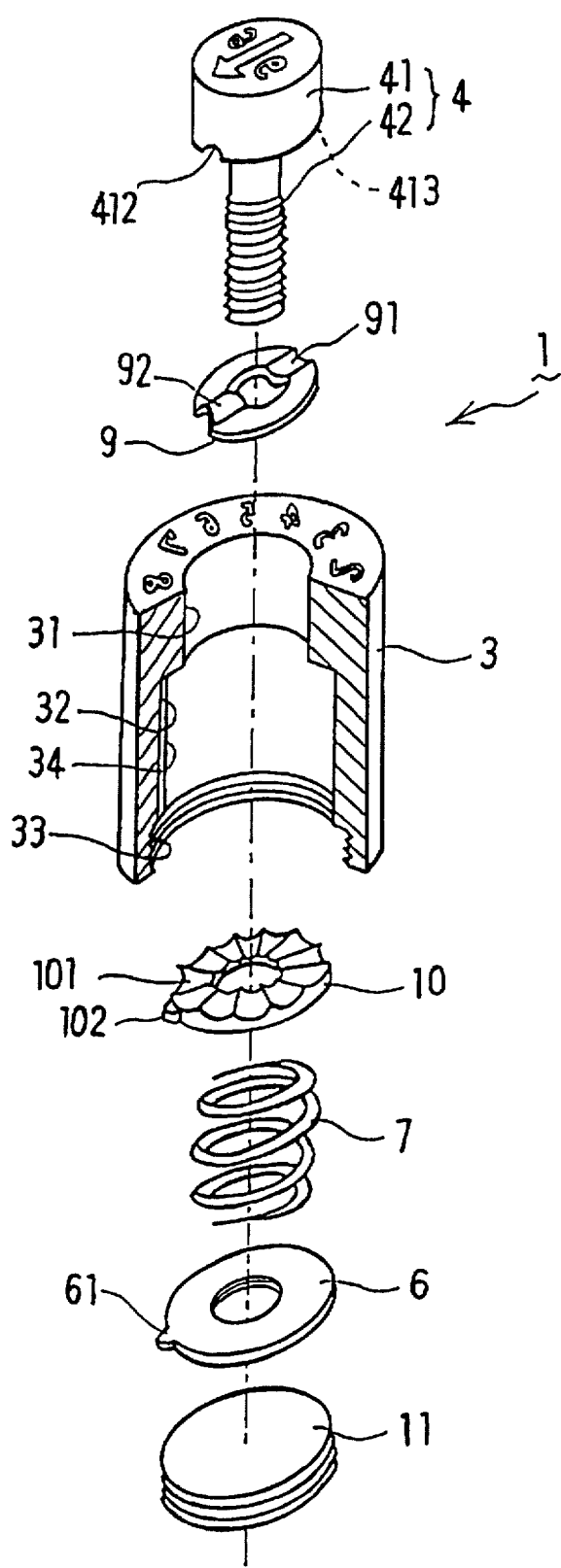
FIG. 7 is a perspective broken view showing an alternative second embodiment.
Figure 8:
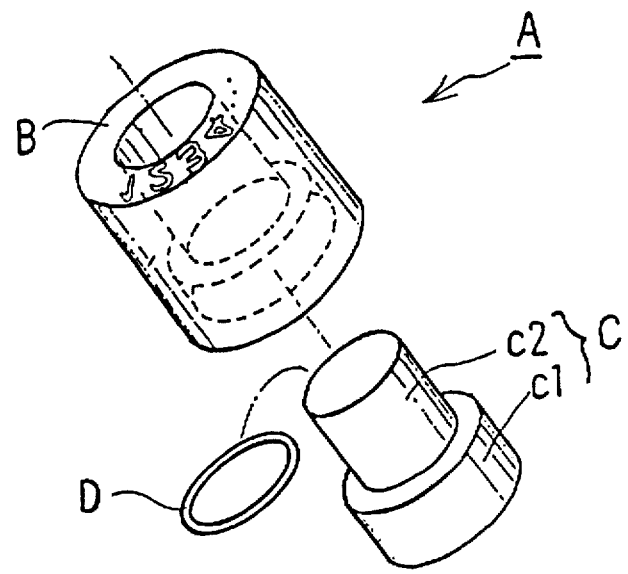
FIG. 8 is a perspective exploded view of one example of prior marking devices.
Figure 9:
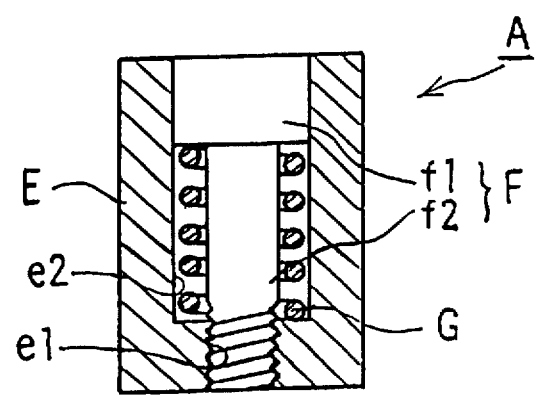
FIG. 9 is a sectional view of another example of prior marking devices.

FIG. 7 is a perspective broken view showing an alternative second embodiment of a removable marking device for a mold (1) relating to the present invention.

In the removable marking device (1) shown in FIG. 7, an axial engageable groove (34) is formed on an inner surface of an outer member (3) at a middle bore portion (32), and projections (102) (61) are respectively formed on outer edges of a second spacer (10) and a nut (6) to engage the engageable groove (34).

In the removable marking device (1) relating to the alternative embodiment, the second spacer (10) and the nut (6) does not rotate when the indicator (4) is rotated since the projections (102) (61) of the second spacer (10) and the nut (6) has been engaged to the engageable groove (34). Thus the indicator (4) can be positioned and fixed exactly so that users can operate the removable marking device (1) efficiently.

In the removable marking device (1) relating to the present invention, indications on the top surfaces of the outer member (3) and the indicator (4) are not limited to the shown examples. The removable marking device (1) may adopt indications formed in such a manner that a month is impressed on the indicator (4) and dates are impressed on the outer member (3), or, a lot number or a product number is impressed combinationally on the indicator (4) and the outer member (3). The removable marking device (1) may adopt any suitable indications impressed on the indicater (4) and the outer member (3) if only the removable marking device can be used for a long time simply by changing of the indicater (4).

I claim:

1. A removable marking device for a mold which includes a substantially cylindrical outer member fitted into the mold, an axially rotatable indicator fitted into the outer member and indications formed on top surfaces of the outer member and the indicator:

the indicator comprising an indication portion facing an inner surface of the mold and a screw portion extended from the indication portion;

the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion;

the indicator inserted into the bore with the indication portion arranged in the upper bore portion and the screw portion arranged in the middle bore portion;

a cover member inserted into the lower bore portion and clinging to the outer member;

a nut threaded to a lower end of the screw portion of the indicator;

a spring interposed above the nut within the middle bore portion; and the indicator biased downwardly by the spring in combination with the nut.

2. A removable marking device for a mold which includes a substantially cylindrical outer member fitted into the mold, an axially rotatable indicator fitted into the outer member and indications formed on top surfaces of the outer member and the indicator:

the indicator comprising an indication portion facing an inner surface of the mold and a screw portion extended from the indication portion;

the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion;

the indicator inserted into the bore with the indication portion arranged in the upper bore portion and the screw portion arranged in the middle bore portion;

a cover member inserted to the lower bore portion and clinging to the outer member;

a nut threaded to a lower end of the screw portion of the indicator;

a spring interposed above the nut and within the middle bore portion;

the indicator biased downwardly by the spring in combination with the nut;

recesses formed circumferentially at even intervals on a bottom surface of the indication portion; and a pin passing through the outer member to be engaged to one of the recesses for positioning and fixing the indicator.

3. A removable marking device for a mold which includes a substantially cylindrical outer member fitted into the mold, an axially rotatable indicator fitted into the outer member and indications formed on top surfaces of the outer member and the indicator;

the indicator comprising an indication portion facing an inner surface of the mold and a screw portion extended from the indication portion;

the indication portion having a projection and a groove on a bottom surface thereof;

a first spacer and a second spacer engaged to the screw portion;

the first spacer provided with a projection and a groove corresponding to the projection and groove of the indication portion and abutting on the bottom surface of the indication portion;

the second spacer having recesses formed circumferentially at even intervals on an upper surface thereof;

the groove of the first spacer engaging one of the recesses of the second spacer;

the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion;

the indicator inserted into the bore with the indication portion and the first spacer arranged in the upper bore portion and the screw portion and the second spacer arranged in the middle bore portion;

the outer member having a thread groove portion on its inner surface at the lower bore portion to which a cover member is threaded;

a nut threaded to a lower end of the screw portion of the indicator;

a spring interposed between the nut and the second spacer; and the indicator biased downwardly by the spring in combination with the nut.

4. A removable marking device for a mold which includes a substantially cylindrical outer member fitted into the mold, an axially rotatable indicator fitted into the outer member and indications formed on top surfaces of the outer member and the indicator:

the indicator comprising an indication portion facing an inner surface of the mold and a screw portion extended from the indication portion;

the indication portion having a projection and a groove on a bottom surface thereof;

a first spacer and a second spacer engaged to the screw portion;

the first spacer provided with a projection and a groove corresponding to the projection and groove of the indication portion and abutting on the bottom surface of the indication portion;

the second spacer having recesses formed circumferentially at even intervals on an upper surface thereof; p1 the groove of the first spacer engaging one of the recesses of the second spacer;

the outer member having a three-stepped bore which comprises an upper bore portion, a middle bore portion extending from the upper bore portion of a cross-sectional dimension larger than that of the upper bore portion and a lower bore portion extending from the middle bore portion of a cross-sectional dimension larger than that of the middle bore portion;

the indicator inserted into the bore with the indication portion and the first spacer arranged in the upper bore portion and the screw portion and the second spacer arranged in the middle bore portion;

the outer member having a thread groove on its inner surface at the lower bore portion to which a cover member is threaded;

a nut threaded to a lower end of the screw portion of the indicator;

a spring interposed between the nut and the second spacer;

the indicator biased downwardly by the spring in combination with the nut;

the outer member having an engageable groove formed axially on its inner surface at the middle bore portion; and each of the second spacer and the nut provided with an engageable projection formed on each of outer edges thereof to engage with the engageable groove.

* * * * *